United States Patent
Rudolf et al.

(10) Patent No.: US 8,280,412 B2
(45) Date of Patent: Oct. 2, 2012

(54) METHOD FOR ENHANCED MOBILE ASSISTED POSITIONING

(75) Inventors: Marian Rudolf, Montreal (CA); Christopher Cave, Candiac (CA); Juan Carlos Zuniga, St. Laurent (CA)

(73) Assignee: InterDigital Technology Corporation, Wilmington, DE (US)

( * ) Notice: Subject to any disclaimer, the term of this patent is extended or adjusted under 35 U.S.C. 154(b) by 1222 days.

(21) Appl. No.: 10/334,806

(22) Filed: Dec. 31, 2002

(65) Prior Publication Data

US 2004/0023671 A1 Feb. 5, 2004

Related U.S. Application Data

(60) Provisional application No. 60/399,859, filed on Jul. 31, 2002.

(51) Int. Cl.
*H04W 24/00* (2009.01)

(52) U.S. Cl. ............ 455/456.5; 455/67.11; 455/422.1; 455/115.1; 455/226.1; 455/517; 455/524

(58) Field of Classification Search ..... 455/456.1–456.6
See application file for complete search history.

(56) References Cited

U.S. PATENT DOCUMENTS

| 6,108,558 A | 8/2000 | Vanderspool, II | |
|---|---|---|---|
| 6,266,014 B1 * | 7/2001 | Fattouche et al. | 455/456.6 |
| 6,801,782 B2 * | 10/2004 | McCrady et al. | 455/517 |
| 7,171,211 B2 * | 1/2007 | Muller | 455/448 |
| 2002/0019231 A1 | 2/2002 | Palenius et al. | |
| 2002/0094820 A1 | 7/2002 | Keranen et al. | |
| 2003/0164794 A1 * | 9/2003 | Haynes et al. | 342/353 |

FOREIGN PATENT DOCUMENTS

| WO | 99/11086 | * 3/1999 |
|---|---|---|
| WO | 02/49379 | 6/2002 |
| WO | 03/083504 | 10/2003 |

* cited by examiner

*Primary Examiner* — Willie J Daniel, Jr.
(74) *Attorney, Agent, or Firm* — Volpe and Koenig, P.C.

(57) ABSTRACT

At a first user equipment (UE), an uplink signal is received of at least one second UE is received and time marked. At the first UE, a downlink signal from at least one base station is received and time marked. Observed time differences of arrival are determined using the time markings. A position of the first UE is determined based on the determined time differences of arrival.

8 Claims, 4 Drawing Sheets

METHOD FOR ENHANCED MOBILE ASSISTED POSITIONING

FIELD OF THE INVENTION

The present invention relates to wireless mobile communication systems. More particularly, it relates to a modification to such systems by employing a mobile user equipment positioning scheme enhanced by user equipment assistance.

BACKGROUND

Enhanced capability for user equipment (UE) positioning is widely seen as a distinguishing and value increasing feature of 3G mobile communications networks such as UMTS W-CDMA FDD or TDD or CDMA2000.

An example for a simple yet effective user equipment (UE) positioning method that is conventionally used in 2G mobile communications systems is the "Cell-ID method", where a UE's position is known on a cell level. The network knows the base station with which the UE has a radio link and can therefore assume that the UE is somewhere within the coverage area of that base station's cell.

Drawbacks of the Cell-ID method are that it is too coarse for macro and large micro-cell deployments and unreliable for small micro and pico-cell deployments.

Another example of a simple location technique is estimation of radial distance per round-trip-time based upon time of arrival of a UE's uplink (UL) transmission at the base station.

An example of a UE positioning method that has been standardized for 3G systems is the observed time difference of arrival (OTDOA) method. As shown in FIG. 1, a UE measures the time of arrival of the downlink (DL) signals from the base stations of several surrounding cells and reports these measurements (or quantities derived from these) back to the network. The location entity in the network then applies basic triangulation techniques based on distances $d_0$, $d_1$, $d_2$ in order to estimate the UE's position. For example, UE measures the time difference of arrival between serving base station 101 and neighboring base station 102, yielding an elliptic band B11 with respect to where UE's position can be. The UE then measures the time difference of arrival for base station 101 and neighboring base station 103, to yield another elliptic band B12 with respect to the UE's possible position. Now, the UE position must necessarily be at the intersection of bands B11 and B12. Each band has an inherent measurement error margin $e_m$. For additional precision, further OTDOA measurements of pairings to other nearby base stations can be used to fine tune the estimate for the point of intersection. The precision and reliability of all OTDOA-based methods increase with increased availability of measurement data, especially when the UE can measure more than just 2 or 3 surrounding base stations. However, a limitation of this method is that the serving base station transmission has a blocking effect on the signals from the surrounding base stations.

FIG. 2 shows an example of how OTDOA performance can be enhanced to combat the blocking effect. Serving base station 201 fully or partially ceases its DL radio transmission intermittently in order to give each UE present in its cell an opportunity for measuring DL parameters of transmitting base stations 202-207 in surrounding cells.

A common feature for OTDOA-based methods is that a position estimation is based upon a triangulation technique where measurements are performed at the UE location on DL signals of surrounding base stations. Positioning accuracy and reliability limitations of OTDOA-based methods arise in small cell sizes and multipath environments.

Another group of UE positioning methods that has been standardized for 3G systems is based upon GPS technology that uses satellite assisted positioning. In GPS, the communication handset receives data transmitted continuously from the 24 NAVSTAR satellites. Each satellite transmits data indicating the satellite's identity, the location of the satellite and the time the message was sent. The handset compares the time each signal was received with the time it was sent to determine the distance to each satellite. Using the determined distances between the satellites and the handset along with the location of each satellite, the handset can triangulate its location and provide the information to a communication base station. However, the incorporation of a GPS within a subscriber unit increases its cost.

Accordingly, it is desirable to have alternate mobile user positioning schemes.

SUMMARY

At a first user equipment (UE), an uplink signal is received of at least one second UE is received and time marked. At the first UE, a downlink signal from at least one base station is received and time marked. Observed time differences of arrival are determined using the time markings. A position of the first UE is determined based on the determined time differences of arrival.

DESCRIPTION OF THE PREFERRED EMBODIMENTS

The performance of positioning methods relying on triangulation techniques can be significantly improved when, in addition to the received DL signals of surrounding base stations at a particular mobile UE's location, the received UL signals of surrounding UEs (including fixed and mobile UEs), whose positions are known, are taken into account for location estimation. This is possible in any wireless communications system where a UE can receive or monitor and measure another UE's UL transmission. Advantages of using a neighboring UE's UL signal are that the UL signal is significantly stronger than a DL signal, and the UL signals are not blocked as are surrounding base station DL signals.

An advantage with using UE uplink transmission in a mobile user position calculation is that the likelihood of a mobile UE being able to receive transmissions from other mobile UEs is much higher than the likelihood of the UE receiving transmissions from multiple base stations. Further-more, the need for intermittent cessation of the mobile user's base station DL transmission to prevent blocking can be avoided.

This principle can be applied to any radio access system, such as UMTS Terrestrial Radio Access (UTRA) TDD, CDMA, TDMA and TD-SCDMA. Preferably, for ease in distinguishing UL and DL signals, it is desirable that UL and DL signals be separated by frequency and/or time, although such separation is not essential.

Figure 1:
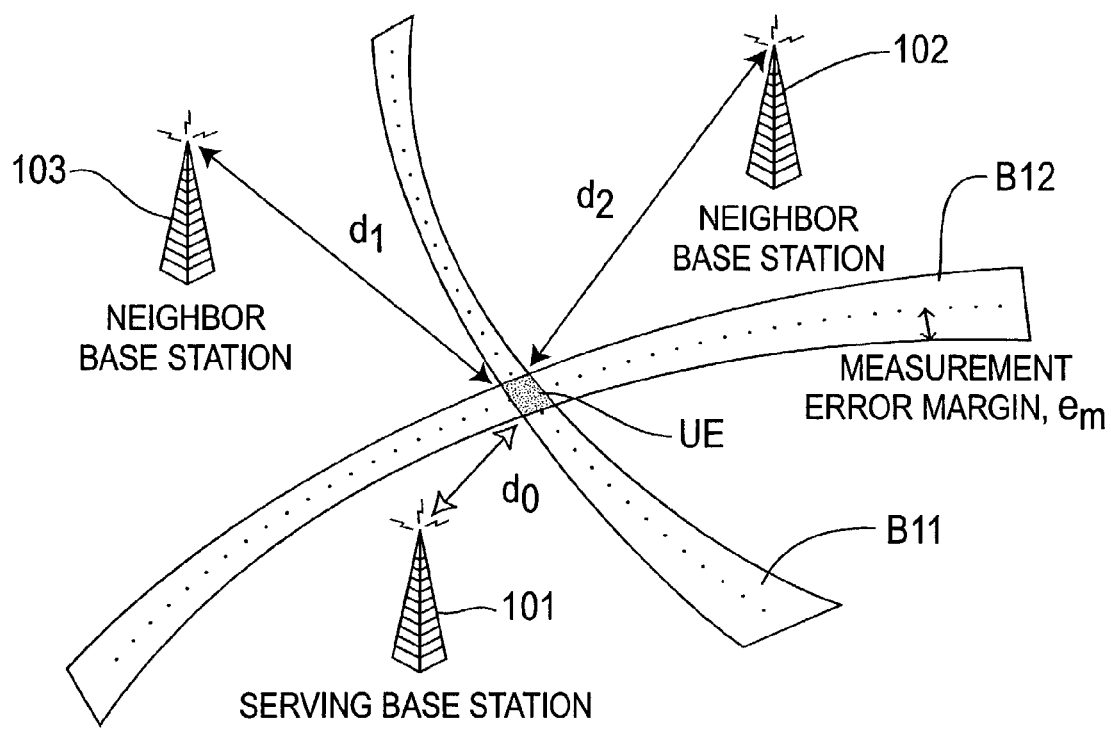
FIG. 1 shows a system using an OTDOA-based mobile positioning method.
Figure 2:
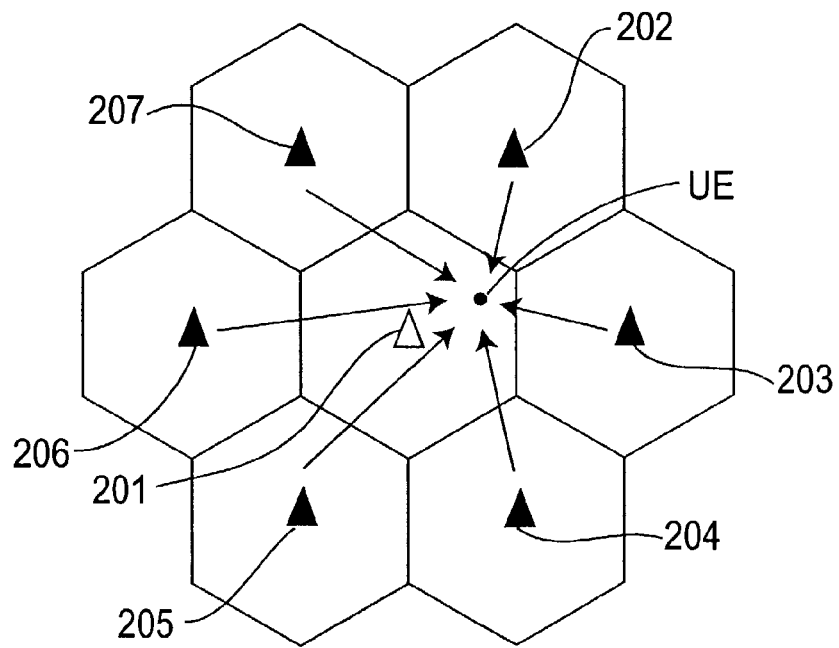
FIG. 2 shows a system using an OTDOA-based mobile positioning method enhanced to prevent blocking.
Figure 3:
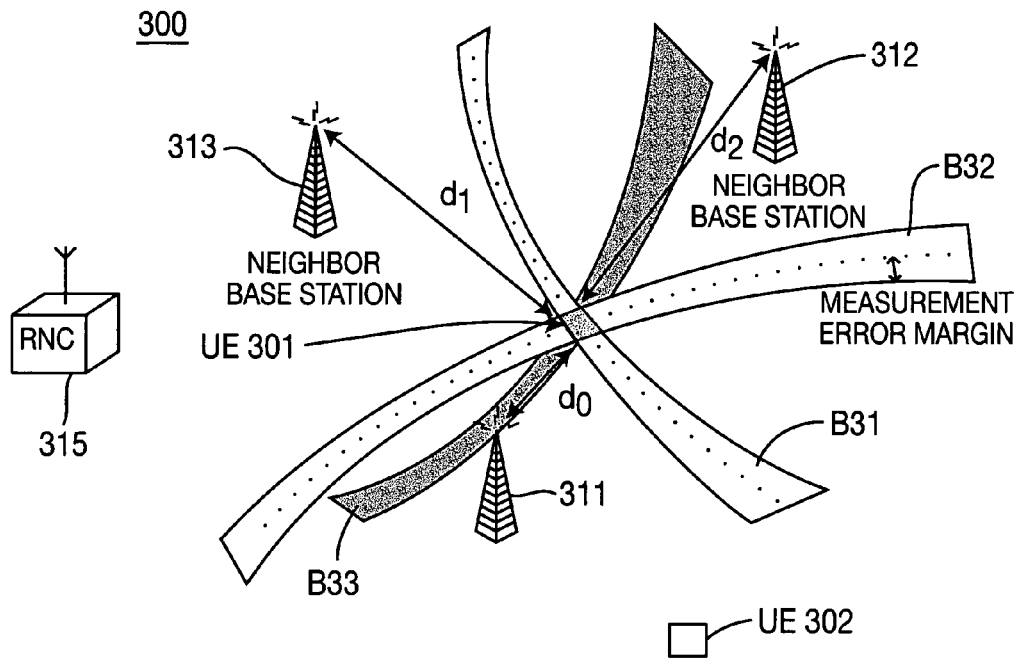
FIG. 3 shows a system using a UE assisted positioning method.

FIG. 3 shows an example of a UE-assisted positioning method operating in a TDD system 300. System 300 comprises base stations 311-313, radio network controller (RNC) 315 and mobile UEs 301, 302. RNCs are well known in the art as controllers of base station clusters. Base station 311 is the serving base station for UEs 301, 302, while base stations 312, 313 are neighboring base stations. Mobile UE 301 is able to receive/monitor UL radio signal of UE 302 and measure its time-of-arrival and/or observed time-difference of arrival (OTDOA) compared to the reception of a reference signal, such as a DL beacon channel, from its base station 311 and/or the neighboring base stations 312, 313. Preferably in a TDD system, UE 301 can perform measurements on UL transmissions of neighboring UEs for location assistance whenever it is idle or when it is not using a UL timeslot for its own transmissions. The timeslots used for UL and DL in the system are determined by the radio access network. Using the time difference information, ellipses between the base stations 311-313 and the UE 302 and base stations 311-313 are determined. As illustrated in FIG. 3, three ellipse bands are constructed. Two bands B31 and B33 between the base stations 311-313 and one band B32 between base station 311 and UE 302. Additionally, distances between the UE 301 and the base stations 311-313 (d0, d1, d2) may also be determined at the base stations 311-313. Using this information, the mobile UE's position is calculated.

Figure 4:
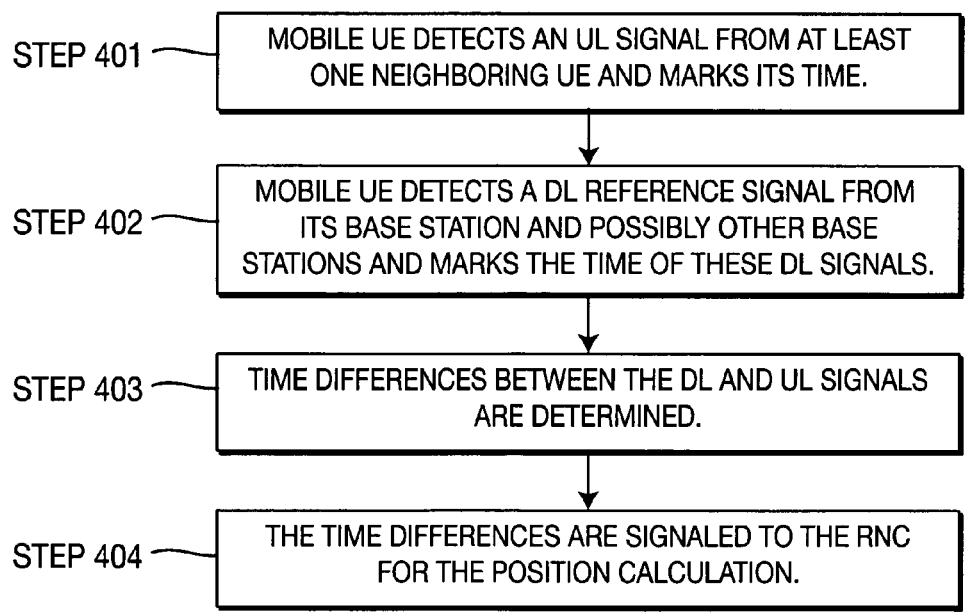
FIG. 4 shows a flowchart for a UE assisted OTDOA-based positioning method.

FIG. 4 shows a flow diagram of a method for a UE-assisted positioning method. A mobile UE detects an UL signal from at least one neighboring UE and marks the time for each neighboring UE, step 401. The mobile UE also detects a DL reference signal from its base station and possibly other base stations and marks the time of each of these DL signals, step 402. The time differences between all of the time marked UL and DL signals are calculated by the mobile UE, step 403. The time differences are preferably signaled to the RNC via the Node-B to make the position calculation, step 404.

Figure 5:
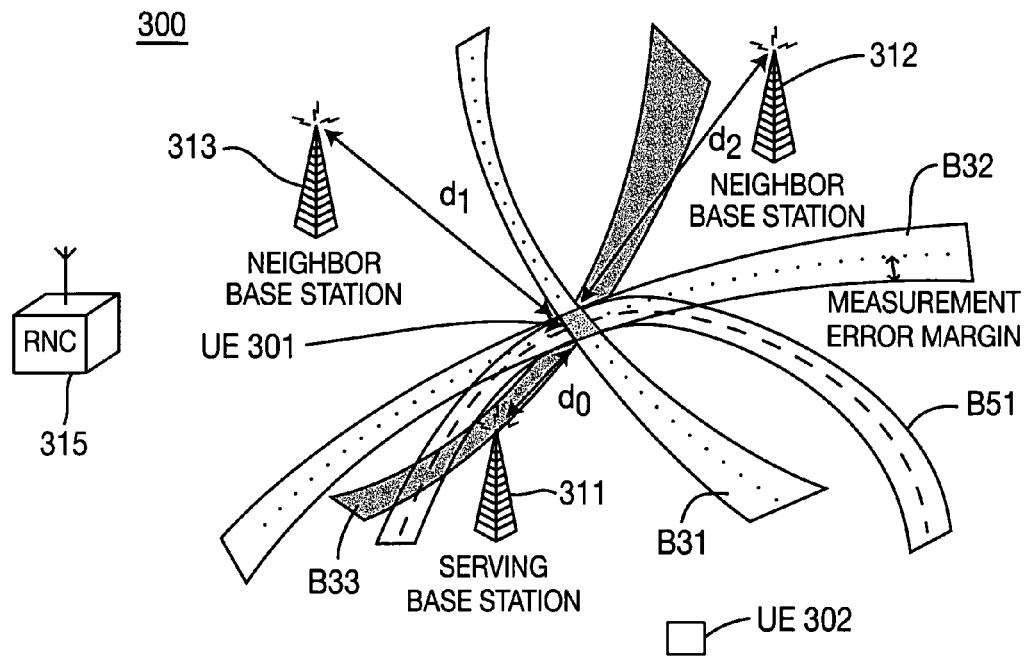
FIG. 5 shows a system using a UE assisted positioning method using a path loss between UEs.

Generally, the more positioning information available for the position calculation improves the accuracy of the resulting calculation. A source for additional positioning information is the received signal code power (RSCP) and the transmission power (TxP) from a neighboring mobile. The UE 301 measures the RSCP of the neighboring mobiles transmission, such as UE 302, and signals this information to the RNC 315. The RNC 315 determines the path loss (TxP-RSCP) between the UE 301 and its neighbor UE 302. Using the determined path loss, a distance between the mobile UE 301 and the UE 302 is determined. This distance information, as shown as a circular band B51 in FIG. 5, adds to the available positioning information. Combined with the other elliptic bands, such as B31, B32 and B33, a more precise estimate of then position of the UE 301 is calculated.

In an alternative embodiment, mobile UE 301 is equipped with smart antenna technology, allowing it to measure and report angle-of-arrival for the received UL signal of neighboring mobile UE 302 compared to a reference azimuth direction. Such a mobile UE may additionally measure and report angle-of-arrival of a serving base station DL and neighboring base station DL and neighboring UE UL transmission.

Figure 6:
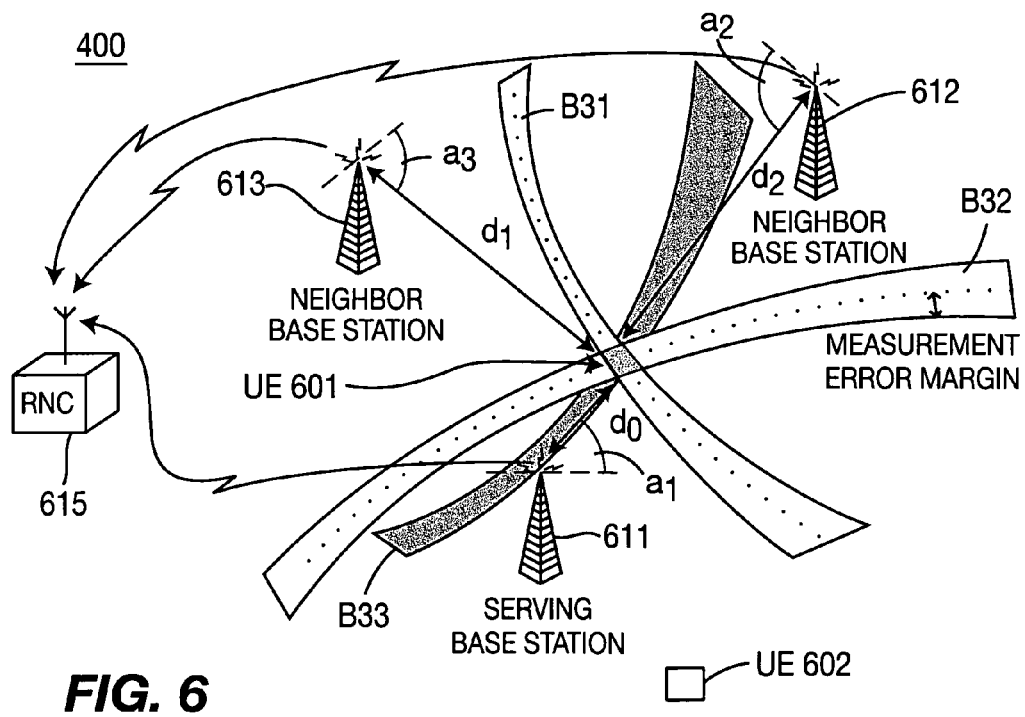
FIG. 6 shows a system using a network controller and base stations equipped with smart antennas.

FIG. 6 shows an alternative embodiment having a cluster of base stations 611-613 in a wireless system 600, each equipped with smart antenna technology. Each base station 611-613 measures and reports to radio network controller 615 the angle-of-arrival, a1, a2, a3, of a UL transmission from mobile UE 601 to aid in determining the position of UE 601.

Figure 7:
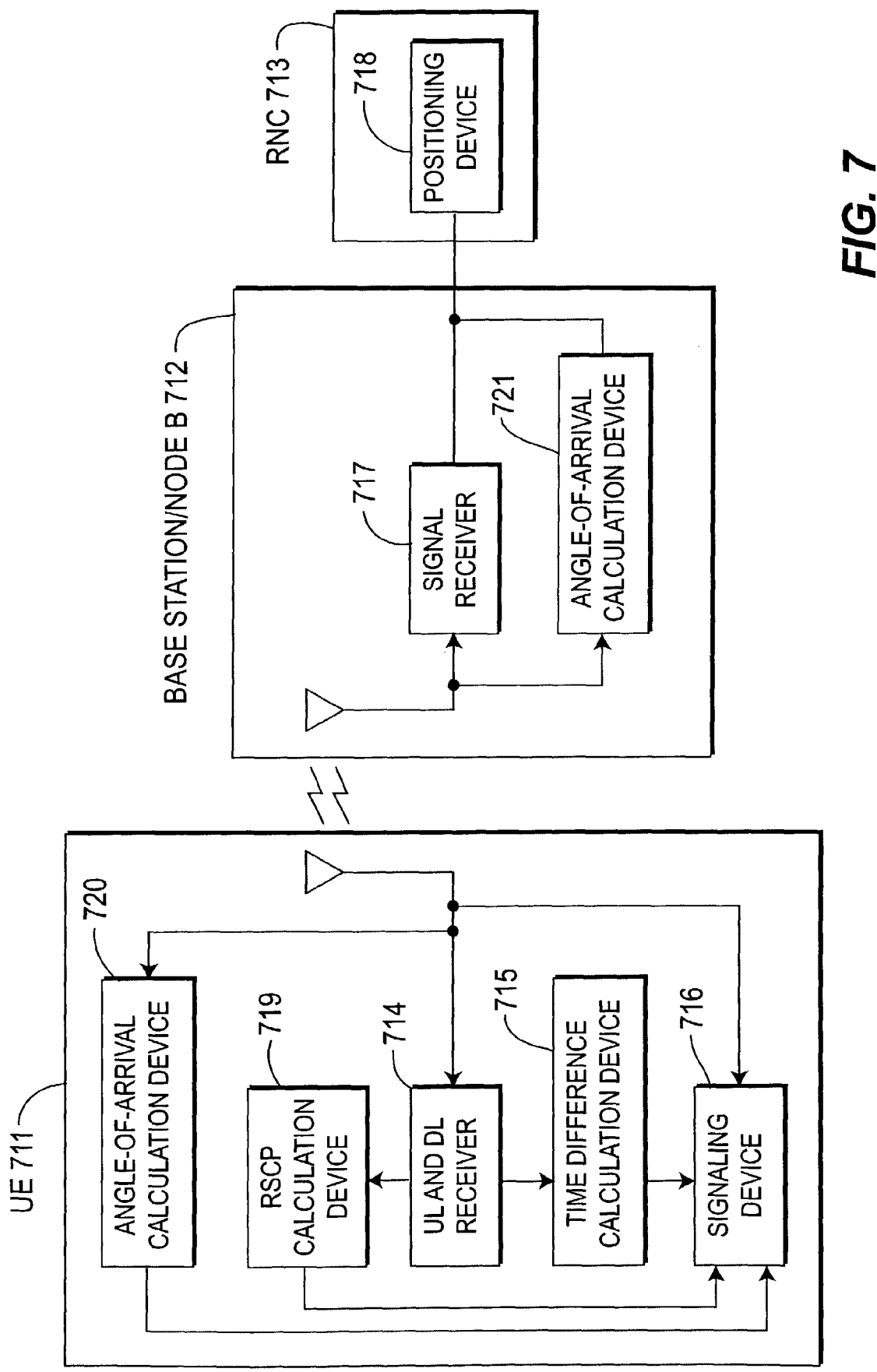
FIG. 7 shows a simplified diagram of a mobile UE, Node-B and radio network controller using a UE assisted positioning method.

FIG. 7 illustrates a simplified mobile UE 711, Node-B 712 and RNC 713 for use in positioning using user equipment assistance. The mobile UE 711 has an UL and DL receiver 714 for receiving signals from base stations and neighboring UEs. A time difference calculation device 715 determines the time of receipt of the UL and DL signals and determines the time difference between the receipt times. A signaling device 716 signals the time difference information to the Node-B 712. The Node-B receives the signaled information using a signal receiver 717 and relays the information to the RNC 713. A positioning device 718 in the RNC 713 uses the time difference information and the known locations of the base stations and neighboring UEs to calculate the mobile UE's location. Additionally, an RSCP determination device 719 and/or an angle-of-arrival device 720 may be used by the mobile UE 711 to provide information of the alternative embodiments as well as an angle-of-arrival device 721 at the base station/Node-B 712.

What is claimed is:

1. A method of determining a position of a mobile user equipment (UE), the method comprising:
   at a first mobile UE:
   receiving and time marking an uplink signal of a second mobile UE;
   receiving and time marking a downlink signal;
   determining observed time difference of arrivals using the time markings of the uplink signal of a second mobile UE and a downlink signal;
   measuring a received signal code power (RSCP) and a transmit power of the second mobile UE for determining a path loss;
   determining an angle-of-arrival of the uplink signal; and
   transmitting the determined observed time difference of arrivals, the RSCP, the transmit power, and the determined angle-of-arrival to a network entity for determining a position of the first mobile UE based on the path loss.

2. The method as in claim 1, further comprising determining an angle-of-arrival of the downlink signal and transmitting the determined angle-of-arrival to the network entity.

3. A mobile user equipment (UE) comprising:
   a receiver configured to receive and time mark an uplink signal of a second mobile UE, and to receive and time mark a downlink signal;
   a time difference calculation device configured to determine observed time difference of arrivals using the time markings of the uplink signal of a second mobile UE and a downlink signal;
   a smart antenna configured to determine an angle-of-arrival of the uplink signal;
   a received signal code power (RSCP) determination device configured to measure the RSCP of the second mobile UE; and
   a transmitter configured to transmit the determined observed time difference of arrivals, the angle-of-arrival of the uplink signal, a transmit power of the second mobile UE, and the RSCP to a network entity for determining a position of the mobile UE based on a path loss determined by the transmit power and the RSCP of the second mobile UE.

4. The mobile UE as in claim 3, wherein the smart antenna is further configured to determine an angle-of-arrival of the downlink signal and the transmitter is further configured to transmit the angle-of-arrival of the downlink signal.

5. A radio network controller comprising:
a positioning device configured to receive an angle-of-arrival of an uplink signal of a first mobile user equipment (UE), to receive an observed time difference of arrivals between an uplink signal and a downlink signal to the first mobile UE, to determine a path loss between the first mobile UE and a second mobile UE based on a received signal code power (RSCP) for the first mobile UE, to determine the distance between the first mobile UE and the second mobile UE based on the path loss, and to calculate the position of the first mobile UE based on the angle-of-arrival, the observed time difference of arrivals, and the distance between the first mobile UE and the second mobile UE.

6. The radio network controller as in claim 5 wherein the RSCP of the second mobile UE, the angle-of-arrival, and the observed time difference of arrivals are received from the second mobile UE.

7. The radio network controller as in claim 5 wherein the positioning device is further configured to receive an angle-of-arrival for a downlink signal sent to the first mobile UE.

8. The radio network controller as in claim 7, wherein the angle-of-arrival for the downlink is received from the second mobile UE.

\* \* \* \* \*